UNITED STATES PATENT OFFICE.

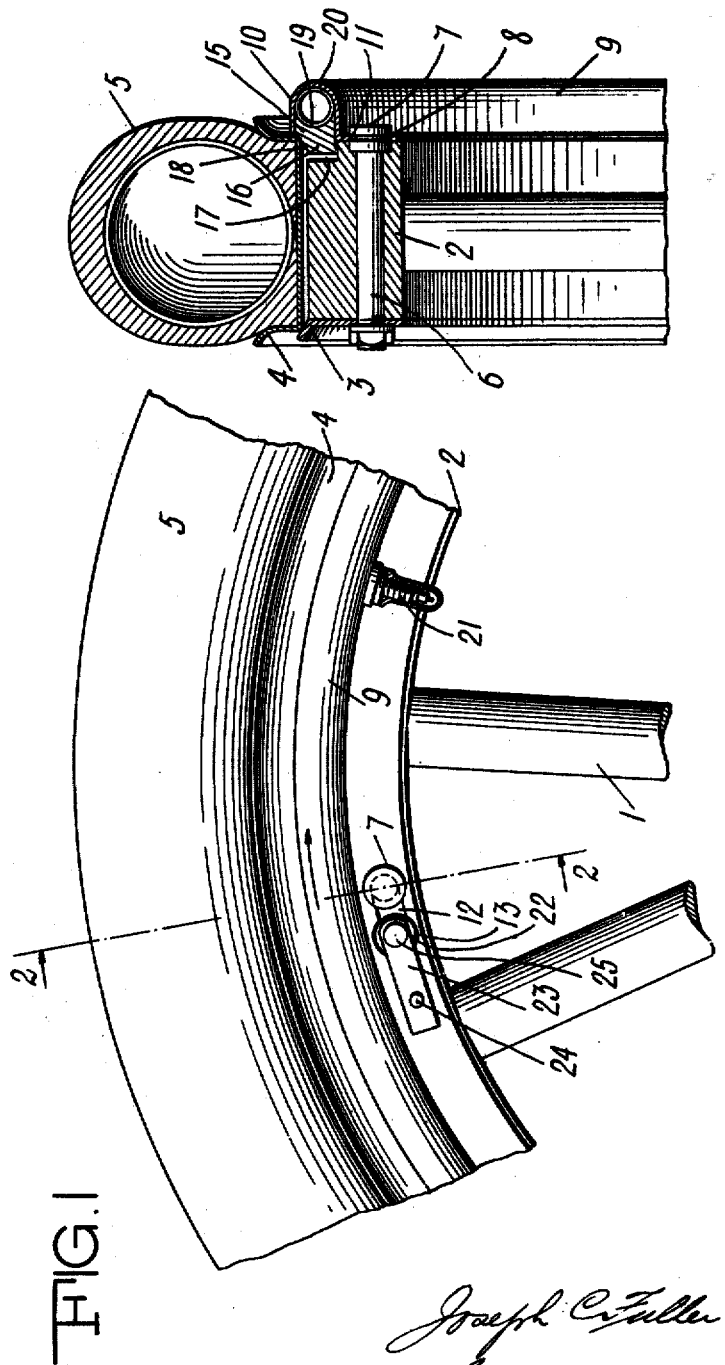

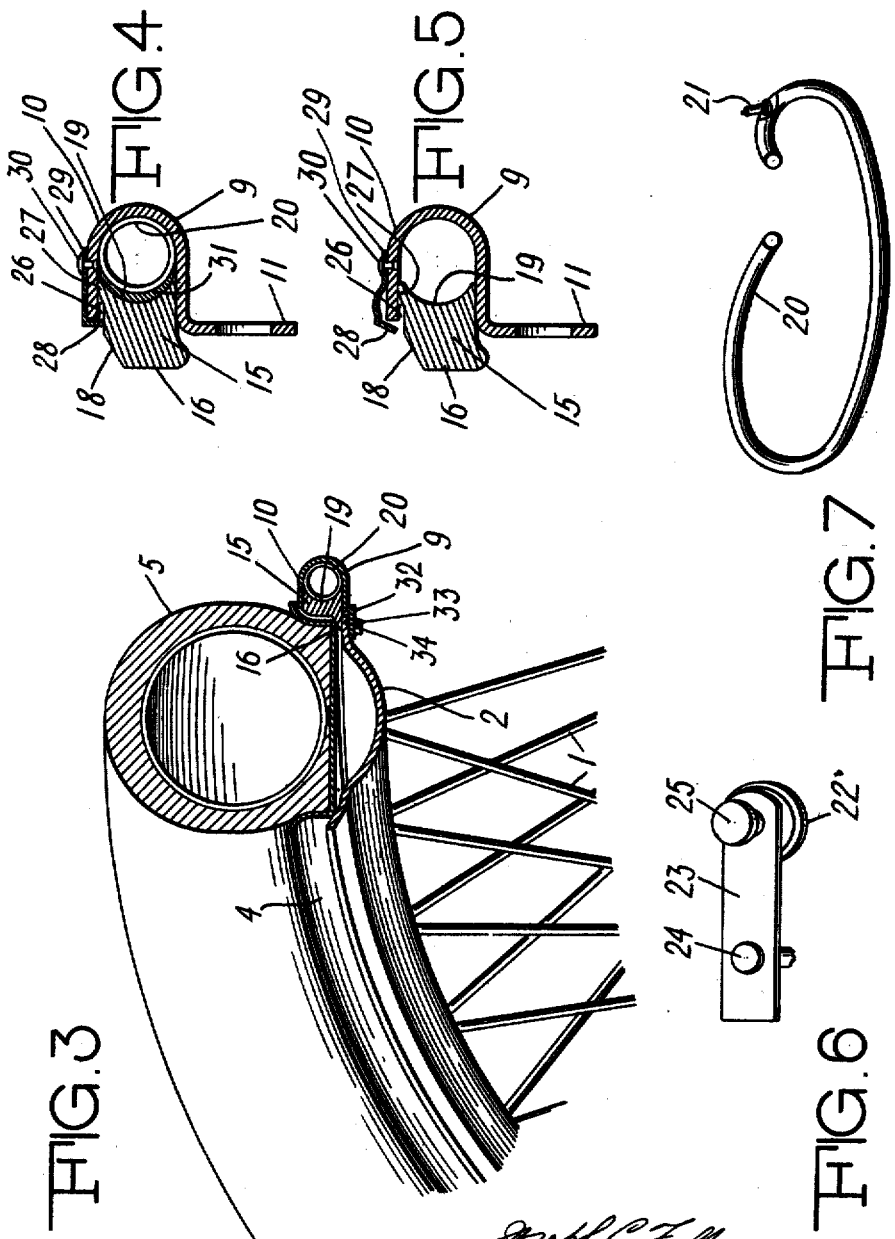

JOSEPH C. FULLER, OF SEWAREN, NEW JERSEY.

FASTENING MEANS FOR DEMOUNTABLE RIMS.

1,315,184.  Specification of Letters Patent.  Patented Sept. 2, 1919.

Application filed September 18, 1917. Serial No. 191,910.

*To all whom it may concern:*

Be it known that I, JOSEPH C. FULLER, a citizen of the United States, residing in Sewaren, New Jersey, have invented certain new and useful Improvements in Fastening Means for Demountable Rims, of which the following is a specification.

My invention comprehends more particularly certain improved retaining means for demountable rims, the object of which is to facilitate the mounting and demounting of the tire carrying rim so that less effort is required and a change of tire may be made with greater expedition than is possible with hitherto known means.

A further object of the invention is to secure the demountable rim in place by a pressure distributed around the rim, such pressure being built up and applied equally at all points throughout the circumference of the rim during the operation of the securing means.

Demountable rims as now almost universally used are secured to the wheel felly by a series of wedges removably fastened to the wheel felly by suitable bolts and nuts. These wedges are distributed around the felly and are tightened or manipulated individually when the tire carrying rim is being mounted or demounted. As a result of this individual manipulation oftimes the rim is not properly positioned upon the felly band owing to a greater pressure being exerted against certain of the wedges in the tightening of the retaining nuts than is applied to others. The consequence of this is that uneven wear of the tire will ensue and squeaking and noise invariably arise to the annoyance of the occupants. In practice, it is found very difficult to tighten these wedges uniformly so that the rim will be properly positioned upon the felly. With my invention, these objectionable characteristics of this type of mounting are eliminated.

In the accompanying drawings, I have illustrated by way of example certain preferable embodiments of my invention, in which—

Figure 1 is a view in side elevation of a fragmentary portion of an automobile wheel illustrating one form of my invention applied thereto.

Fig. 2 is a cross-sectional view taken on line 2—2 of Fig. 1.

Fig. 3 is a view in perspective of a fragmentary portion of a wire wheel showing the application of my invention thereto.

Figs. 4 and 5 are vertical cross-sectional views illustrating certain details.

Fig. 6 is a view in perspective of a spring latch used for locking the rim retaining means in operative position.

Fig. 7 is a perspective view of a modified form of pressure retaining member.

Referring to Figs. 1, 2 and 6, 1 indicates the spokes, 2 the felly, 3 stop flange mounted thereon, 4 demountable rim and 5 pneumatic tire mounted thereon, all of which may be of a conventional type. Passing through the felly at equi-distant points therearound are the series of bolts 6 having provided at one end a retaining head or flange 7, spaced from the side of the felly so as to provide a reduced neck or shank portion 8 for the reception of a slotted retaining ring 9. This slotted retaining ring is annular in form extending completely around the felly of the wheel and is provided with a U-shaped or channel-like extension 10 and a flanged portion 11 adapted to fit closely against the side of the felly, this flange portion being provided with slotted or cutout portions 12 for the reception of the bolts 6. The slots 12 are enlarged at one end as at 13 to enable the head 7 to freely pass and reduced at the other end so to receive the shank 8 of the bolt with the bolt head 7 outside acting to retain the ring in position after it has been given a partial rotation.

Positioned within the U-shaped or channel-like portion of the retaining ring 10 is a wedge-shaped ring 15 provided with an extremity 16 operating within a cutaway portion 17 in the wheel felly. This wedge ring is also provided with an angular face or chamfered surface 18 which engages the demountable rim 4 and serves to wedge the rim laterally of the felly and radially thereof upon its manipulation. The wedging ring 15 is also provided with a circular face 19 conforming to the contour of an inflatable member 20 positioned between it and the wall of the U-extremity of the retaining ring 9. This inflatable member is provided with a valve 21 extending through a hole in the ring 9, so as to enable its inflation or deflation as exigencies require. The inflatable member 20 is preferably made of rubber similar to the inner tube of a pneumatic tire excepting, of course, on a greater reduced cross-sectional scale.

It is obvious that upon inflation of the tube or member 20 through the valve 21, the wedging ring 15 will tend to move the demountable rim 4 laterally of the wheel felly and radially thereof until it is firmly secured in its proper position. It is equally obvious that the pressure built up in the tube is equally distributed throughout the circumferences of the wedging ring 15, so that the demountable rim will be caused to uniformly seat itself in proper alined position upon the felly.

In order to lock the retaining ring 9 in position to prevent accidental dislodgment of said ring, a locking disk 22 is used. This locking disk is arranged to fit within the recess 13 provided in the retaining ring and is held therein by the spring member 23 upon which it is mounted. This spring member 23 is fastened to the retaining ring at 24, and a head 25 is provided for its convenient manipulation.

To dismount a tire, the valve 21 in the valve casing is depressed so as to relieve the air pressure within the member 20. This releases the wedging ring 15 and permits its disengagement from the demountable ring, then by withdrawing the pins 22 and revolving the spring members 23 around pivots 24, the retaining ring 9 can then by a partial rotary movement in the direction of the arrow (see Fig. 1) aline the heads 7 of the bolts 6 with the enlarged openings 13 in the retaining ring after which the ring, wedge and pressure tube may be removed from the wheel as well as the demountable rim.

The inflatable member 20 may be a tube in the form of an annulus, or it may be a blind ended tube such as shown in Fig. 7 in which case the ends would be slightly overlapped before inflating. It may be of advantage to provide means for retaining the wedging ring 15 and the inflatable pressure member 20 in assembled relation with respect to the retaining ring 9 so as to enable them to be handled as a unit. I have shown a means for accomplishing this in Fig. 4, in which the wedging ring is provided with a cutaway portion 26 and an extension 27 adapted to, by its engagement with a depending finger 28, form a continuation of the plate 29 riveted at 30 to the ring to be retained in assembled position. This plate 29 may be formed of springy material and may be provided with a bent-up portion 30 to enable its displacement by a screw driver or other implement, thus permitting the convenient separation of the wedging ring and inflatable member from the retaining ring. I may also find it of advantage to use a fabric flap or covering 31, the edges of which extend beyond the edges of the wedging ring, so as to prevent the tubular inflatable member from becoming pinched between the wedging ring and the retaining ring.

In Fig. 3, I have illustrated my invention as applied to a wire wheel in which case the wedging ring is of slightly different formation and the retaining ring instead of having a flange 11 diverging at right angles to the legs of the U, it extends coincident thereto, as at 32, so as to engage a coinciding flange 33 of the metal felly plate of the wheel. Similar locking means may be employed to that illustrated and described in connection with Figs. 1 and 2, excepting that the headed retaining bolt in this instance will comprise a short headed stud 34 riveted or otherwise suitably fastening to the wheel rim. In both cases, the retaining ring will be given a partial rotary movement to aline the headed retaining lugs with the enlarged cutout portions of the ring slots to permit the removal of the ring from the felly.

While I have illustrated and described the principles of my invention as applied to certain specific embodiments, I have done this in an illustrative rather than in a definitive sense, wishing it to be understood that structural details and arrangements of parts may be changed and departed from without departing from the spirit and scope of my invention, as defined by the appended claims.

Having thus described my invention, what I claim as new herein and desire to secure by Letters Patent is:

1. The combination of a vehicle wheel provided with a demountable rim, fastening means therefor comprising a member adapted to coöperate with the felly of the wheel and demountable rim to exert pressure against the latter tending to move it laterally and radially of the wheel and an extensible air tube coöperating with the wedge member tending to move it toward the wheel felly and means for securing the wedge member and extensible tube in operative position with relation to the wheel.

2. The combination with a vehicle wheel, of a demountable rim, means for securing said rim upon said wheel, said means comprising a wedge member, a pneumatic tube and retaining means therefor comprising a trough-shaped ring member having detachable connection with the felly of the wheel.

3. The combination with a vehicle wheel provided with a demountable rim, means for securing said rim upon the wheel, said means comprising a wedge member in the form of an annulus and an inflatable tube juxtaposed thereto, a ring detachably secured to the felly of the wheel and provided with an extension adapted to coöperate with the inflatable tube to hold it in place, so that its inflation will cause the wedge member to tighten the demountabe rim upon the wheel.

4. The combination with a wheel provided with a demountable rim, locking means for securing the rim in place upon the wheel, said locking means comprising a wedge member, an inflatable tube coöperating therewith, retaining means for said wedge member and inflatable tube, said retaining means including a slotted ring, a plurality of headed studs secured to the wheel in position to coöperate with the slots of the ring and adapted when properly positioned to retain the ring in proper operative position upon the wheel.

5. The combination with a wheel provided with a demountable rim, locking means for securing the rim in place upon the wheel, said locking means comprising a wedge member and inflatable tube, said retaining means including a slotted ring, a plurality of headed studs secured to the wheel in position to coöperate with the slots of the ring and adapted when properly positioned to retain the ring in proper operative position upon the wheel, and locking means for said ring, said means comprising a plurality of spring-pressed studs carried by the ring and adapted to coöperate with the slots thereof and the felly.

6. The combination of a vehicle wheel provided with a demountable rim, locking means for securing same upon the wheel, said locking means comprising a wedge member, a pneumatic tube and retaining means therefor comprising a trough-shaped ring detachably secured to the wheel felly, said ring being provided with retaining fingers adapted to coöperate with the wedge member to hold the wedge member and pneumatic tube in assemblage with respect to the trough-shaped ring.

7. The combination with a vehicle wheel provided with a demountable rim, means for securing said rim upon said wheel, said means comprising a wedge member, a pneumatic tube, a flexible flap or covering interposed between the pneumatic tube and wedge member and extending beyond the edges of the latter, retaining means for the wedge member and pneumatic tube comprising a trough-shaped ring having a part detachably secured to the wheel felly.

JOSEPH C. FULLER.

Copies of this patent may be obtained for five cents each, by addressing the "Commissioner of Patents, Washington, D. C."